(12) United States Patent
Qi et al.

(10) Patent No.: US 10,810,153 B2
(45) Date of Patent: Oct. 20, 2020

(54) CHIP PROCESSING DEVICE AND METHOD FOR CHIP PROCESSING USING THE SAME

(71) Applicant: APEX MICROELECTRONICS CO., LTD., Zhuhai (CN)

(72) Inventors: Meichao Qi, Zhuhai (CN); Jinxin Liu, Zhuhai (CN); Peng Lou, Zhuhai (CN); Bin Zhou, Zhuhai (CN); Hao Chen, Zhuhai (CN)

(73) Assignee: APEX MICROELECTRONICS CO., LTD., Zhuhai (CN)

( * ) Notice: Subject to any disclaimer, the term of this patent is extended or adjusted under 35 U.S.C. 154(b) by 1274 days.

(21) Appl. No.: 15/055,496

(22) Filed: Feb. 26, 2016

(65) Prior Publication Data
US 2016/0179736 A1    Jun. 23, 2016

Related U.S. Application Data

(63) Continuation of application No. PCT/CN2014/075174, filed on Apr. 11, 2014.

(30) Foreign Application Priority Data

Aug. 27, 2013    (CN) .......................... 2013 1 0379253

(51) Int. Cl.
   *G06F 13/42*    (2006.01)
   *G05B 19/418*   (2006.01)
   *G06F 13/36*    (2006.01)

(52) U.S. Cl.
   CPC ....... *G06F 13/42* (2013.01); *G05B 19/41845* (2013.01); *G06F 13/36* (2013.01); *Y02P 90/16* (2015.11)

(58) Field of Classification Search
   CPC ......... G03G 21/1878; G03G 2221/1823; B41J 2/17506
   See application file for complete search history.

(56) References Cited

U.S. PATENT DOCUMENTS 7,088,928 B2 *  8/2006  Burchette .............. G03G 15/55
                                                    399/12
7,315,708 B2 *  1/2008  Burchette ............ G03G 15/553
                                                   399/109

(Continued)

FOREIGN PATENT DOCUMENTS

CN    101089895 A    12/2007
CN    101387816 A     3/2009

(Continued)

OTHER PUBLICATIONS http://www.chipresetters.com—"Patel Traders"—23 Pages, Retrieved Mar. 11, 2020 (Year: 2020).*

(Continued)

*Primary Examiner* — Brian T Misiura
(74) *Attorney, Agent, or Firm* — J.C. Patents

(57) ABSTRACT

The present invention provides a chip processing device and a method for chip processing using the same, where the device can program, detect, reset or inspect a plurality of chips, and meanwhile has one or more functions of programming, detecting, identifying, resetting or inspecting. The plurality of chips has different communication interfaces, and/or uses different communication protocols. The chip processing device can be configured to program, detect, identify, reset or inspect a chip after obtaining the model of the chip to be processed, thus having higher universality.

12 Claims, 9 Drawing Sheets

(56) References Cited

U.S. PATENT DOCUMENTS

| | | | | |
|---|---|---|---|---|
| 7,515,837 | B2* | 4/2009 | Thacker | G03G 15/55 399/111 |
| 7,971,947 | B2* | 7/2011 | Burchette | B41J 2/17546 347/5 |
| 8,602,536 | B1* | 12/2013 | Sarnoff | B41J 2/17506 347/85 |
| 8,666,263 | B2* | 3/2014 | Zhang | G03G 21/1878 358/1.14 |
| 8,696,090 | B2* | 4/2014 | Xiao | B41J 2/1752 347/50 |
| 9,357,091 | B2* | 5/2016 | Zhang | G03G 21/1882 |
| 9,645,546 | B2* | 5/2017 | Wang | G03G 21/1875 |
| 2005/0271415 | A1* | 12/2005 | Burchette | G03G 15/553 399/109 |
| 2011/0206387 | A1 | 8/2011 | Zhang | 399/12 |
| 2020/0166919 | A1* | 5/2020 | Ozawa | G05B 23/0272 |

FOREIGN PATENT DOCUMENTS

| | | |
|---|---|---|
| CN | 101419438 A | 4/2009 |
| CN | 102393734 A | 3/2012 |

OTHER PUBLICATIONS

Unismart II—Chipping System Operation Notes Ver 3.18—10 Pages, Retrieved Mar. 11, 2020 (Year: 2020).*
ApexMic—"Unismarte Update Notifications, V3.24.4"—10 Pages, Dated Nov. 24, 2015 (Year: 2015).*
International Search Report of corresponding International PCT Application No. PCT/CN2014/075174, dated Jul. 11, 2014.

* cited by examiner

CHIP PROCESSING DEVICE AND METHOD FOR CHIP PROCESSING USING THE SAME

CROSS-REFERENCE TO RELATED APPLICATIONS

This application is a continuation of International Application No. PCT/CN2014/075174, filed on Apr. 11, 2014, which claims priority to Chinese Patent Application No. 201310379253.X, filed on Aug. 27, 2013, both of which are hereby incorporated by reference in their entireties.

TECHNICAL FIELD

The present invention relates to imaging technologies and, in particular, to a chip processing device and a method for chip processing using the same.

BACKGROUND

Existing imaging device such as a printing device forms an image on a paper utilizing an imaging cartridge detachably mounted to a main body side of the imaging device, and a chip is disposed on the imaging cartridge generally. The chip includes a read-write interface and a storage circuit, which is stored with relevant data of the imaging cartridge, such as date of manufacture, serial number, color of recording material and remaining quantity of recording material. For an ink jet printer, the recording material is ink, and as for a laser printer, the recording material is toner. Subsequent to manufacture of the chip, and during use of the imaging cartridge, it is needed to keep abreast of usage of the chip of the imaging cartridge timely, in order to obtain relevant data of the chip of the imaging cartridge, a chip detecting device is provided in the prior art, and the chip detecting device is generally provided with a storage circuit, a control circuit and a test interface, where the test interface is connected to a read-write interface of the chip of the imaging cartridge, used for reading data to be learned from the chip of the imaging cartridge.

With increasing number of models of imaging devices applied for various needs, number of models of imaging cartridges and chips thereof are also increasing, and the chips of the imaging cartridges with different models tend to use different communication protocols. Since there is only one type of test interface connected to a chip, or only one model of communication protocol is supported, an existing chip detecting device can only detect chips of imaging cartridges having a same communication protocol. In order to detect varieties of chips of imaging cartridges having different communication protocols or different read-write interfaces, a plurality of corresponding chip detecting devices need to be designed in the prior art accordingly, that is, the existing chip detecting device does not have commonality. Thus, there is no doubt that detecting costs are increased and inventory issues for the chip detecting devices have arisen, and meanwhile detection operations for the chips are also complicated.

SUMMARY

With regard to deficiencies in the prior art, the present invention provides a chip processing device and a method for chip processing using the same, thus having higher commonality.

A chip processing device according to the present invention includes:

a main unit and a test head;

where the main unit includes a storage module, a processing module, an input/output module and an interface module;

the storage module is stored with a plurality of chip models, communication protocols corresponding to the plurality of chip models, and information about a plurality of processing modes of the chip processing device, the plurality of processing modes at least comprises a inspection mode;

the input/output module is configured to input a processing mode of a to-be-processed chip, input a chip model of the to-be-processed chip, or output a processing result;

the processing module is configured to acquire a communication protocol corresponding to the to-be-processed chip in the storage module according to the chip model of the to-be-processed chip as input by the input/output module or a chip model acquired by identifying the to-be-processed chip; and control the test head to perform a processing treatment corresponding to the processing mode input by the input/output module to the to-be-processed chip according to the communication protocol corresponding to the to-be-processed chip;

the interface module is configured to perform communication connections with the test head;

the test head includes a communication interface and a test interface, where:

the communication interface is configured to perform communication connections with the interface module of the main unit;

the test interface is configured to perform communication connections with the to-be-processed chip.

A chip processing method using a chip processing device according to the present invention includes:

acquiring a chip model and a processing mode of a to-be-processed chip;

acquiring a communication protocol corresponding to the to-be-processed chip according to the chip model of the to-be-processed chip;

connecting the to-be-processed chip to the chip processing device via a test head;

performing a processing treatment corresponding to the processing mode to the to-be-processed chip according to the communication protocol corresponding to the to-be-processed chip; and outputting a result of the processing treatment.

The present invention provides a chip processing device and a method for chip processing using the same, where the device can program, detect, reset or inspect a plurality of chips, and meanwhile has one or more functions of programming, detecting, identifying, resetting or inspecting. The plurality of chips has different communication interfaces, and/or uses different communication protocols. The chip processing device can be configured to program, detect, identify, reset or inspect a chip after obtaining the model of the chip to be processed, thus having higher commonality.

DESCRIPTION OF EMBODIMENTS

With regard to the deficiency in the prior art that a chip detecting device does not have commonality, embodiments of the present invention provide a chip processing device capable of being applied for processing of various models of chips, thereby improving the commonality of the processing device.

Figure 1:
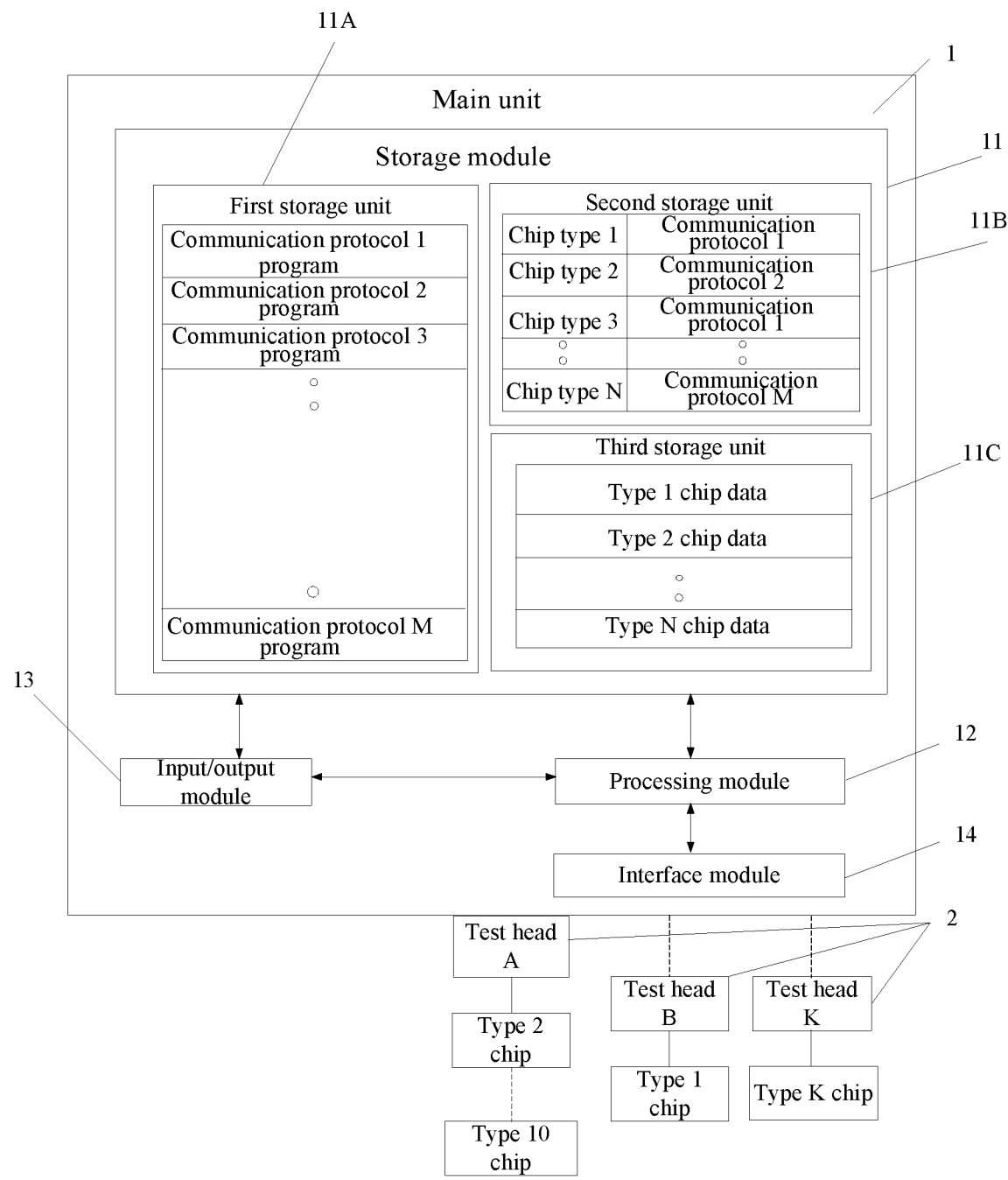
FIG. 1 is a schematic diagram of composition of a chip processing device according to an embodiment of the present invention.

FIG. 1 is a schematic diagram of composition of a chip processing device according to an embodiment of the present invention, as shown in FIG. 1, the chip processing device includes a main unit 1 and a test head 2, where the test head 2 may include various models so as to be applicable to to-be-processed chips of different models or types. The main unit 1 includes a storage module 11, a processing module 12, an input/output module 13 and an interface module 14. The storage module 11 stores a plurality of chip models, communication protocols corresponding thereto, and information about a plurality of processing modes of the chip processing device, where the processing modes include, for instance, programming, detecting, identifying, resetting or inspecting, among which at least the inspection mode is included. The processing module 12 is configured to acquire a communication protocol corresponding to the to-be-processed chip in the storage module 11 according to the chip model of the to-be-processed chip as an input by the input/output module 13 or a chip model acquired by identifying the to-be-processed chip; and control the test head 2 to perform a processing treatment corresponding to the processing mode input by the input/output module 13 to the to-be-processed chip according to the communication protocol corresponding to the to-be-processed chip. The interface module 14 is configured to perform communication connections with the test head 2. The test head 2 includes a communication interface and a test interface, when the chip processing device includes a variety of test heads, test interfaces in the test heads are different, where the communication interface is configured to perform communication connections with the interface module 14 of the main unit 1, and the test interface is configured to perform communication connections with the to-be-processed chip.

Specifically, information stored in the storage module 11 can be stored in one storage unit, and can also be stored in separate storage units respectively. In the prior art, generally, merely a look up table between chip models and all data thereof is established, data and communication protocols of each chip model need to be stored, which thus needs to occupy extremely large storage space. The present invention not only can use a storage manner in the prior art, but also can consider sort storing of various data and communication protocols, for chips of different models using a part of same data or communication protocols, these data and communication protocols can be shared, and only need to be stored for one copy, thereby significantly optimizing storage redundancies and saving storage spaces, and thus costs are reduced.

In FIG. 1, the storage module 11 may include three storage units, which respectively are: a first storage unit 11A, a second storage unit 11B and a third storage unit 11C, where the first storage unit 11A is configured to store communication protocols corresponding to the chip models, such as programs of a communication protocol 1 to a communication protocol M (N>=M>=1). The second storage unit 11B is configured to store a corresponding relation between the chip models and the communication protocols, for instance, chip model 1 corresponds to communication protocol 1, thus, a program of the communication protocol 1 may be obtained in the first storage unit 11A according to the corresponding relation after obtaining that a chip model is a model 1. The third storage unit 11C is configured to store data of chips of N (N>=2) different models, and chip data usually includes one or more pieces of information such as the serial number, date of manufacture, color of recording materials and using area, which are used for various processing modes, for instance, in a programming mode, chip data in the storage module 11 needs to be programmed to a to-be-processed chip of a corresponding model, certainly, if the chip processing device is not provided with an operating mode requiring to store the chip data, then the storage module 11 may not include the third storage unit 11C, which may be arranged according to actual needs. The first storage unit 11A, the second storage unit 11B and the third storage unit 11C may be independent memories, and may also be three storage areas in a same memory. It should be noted that, since one test head may be used for chips of one model or different models, there isn't a one-to-one correspondence between types of test heads and communication protocols of the chips, a test head may also correspond to a plurality of communication protocols. Since a plurality of test heads may correspond to more communication protocols, then the chip processing device including a plurality of test heads has broader universality than that including only one test head.

Moreover, the storage module 11 also needs to store information about a plurality of processing modes, the information about the processing modes is a processing method corresponding to a processing mode, that is, information about how the chip processing device processes the to-be-processed chip after a processing mode is determined (a corresponding storage unit is not shown in the drawings).

The input/output module 13 is configured to input a processing mode of a to-be-processed chip, input a chip model of the to-be-processed chip, or output a processing result. The processing module 12 is configured to acquire a communication protocol of the to-be-processed chip according to the input chip model or a chip model acquired by identifying the to-be-processed chip, and according to a current operating mode of the main unit 1, control the test head 2 to perform an operation of reading data of the to-be-processed chip or writing data into the to-be-processed chip according to the communication protocol, and then determine whether the data of the to-be-processed chip is correct or whether the data is written successfully. The input/output module 13 is further configured to output information indicating that the chip is normal when the processing module 12 determines that the data of the to-be-processed chip is correct, output information indicating successful written when successfully writing the data into the to-be-processed chip, output information indicating chip failure when the processing module 12 determines that the data of the to-be-processed chip is not correct, and output information indicating written failure when the data is not successfully written into the to-be-processed chip. The interface module 14 serves as an interface establishing electrical connections between the main unit 1 and the test head 2, and the test head 2 is configured to perform communications with the to-be-processed chip under the control of the processing module 12.

The test head 2 includes a communication interface and a test interface, which is connected to the main unit 1 via the communication interface in a detachable manner, and which is configured to read data of the to-be-processed chip or write data into the to-be-processed chip under the control of the processing module 12. The test head 2 and the main unit 1 may be connected by means of a wired connection approach or a wireless connection approach, and the test head and the to-be-processed chip may also be connected by means of a wired connection approach or a wireless connection approach.

It should be noted that, a normal electronic device also includes an electric module and some other modules, which is common knowledge for persons of ordinary skill in the art, and will not be repeated herein in the present invention.

Figure 2:
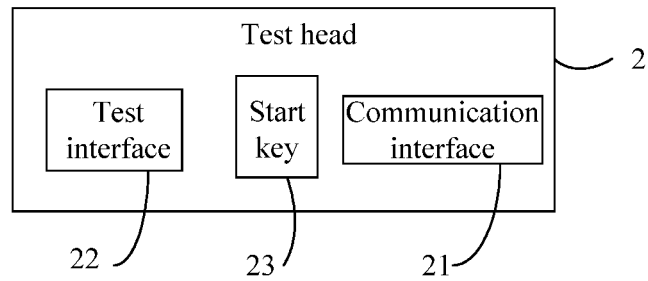
FIG. 2 is a schematic diagram of composition of a test head according to an embodiment of the present invention.

Test heads provided in the present invention will be described in detail hereunder. FIG. 2 is a schematic diagram of composition of a test head according to an embodiment of the present invention, as shown in FIG. 2, the test head 2 is a replaceable test head, which includes a communication interface 21 and a test interface 22, and which is connected to the interface module 14 of the main unit 1 via the communication interface 21 in a detachable manner, thereby forming an electric connection with the main unit 1, and which is configured to read data of the to-be-processed chip or write data into the to-be-processed chip under the control of the processing module 12. Moreover, since a user usually processes the to-be-processed chip by holding the test head, then a start key 23 for a processing mode may also be provided on the test head 2, after pressing the start key 23, a signaling for starting a corresponding processing mode can be transferred to the processing module 12 of the main unit 1 via the communication interface 21, in this case, the user may not need to operate the input/output module 13 at the time of holding the test head 2, which facilitates operations of the user.

The test head 2 and the main unit 1 may be connected by means of a wired connection approach or a wireless connection approach. The wired connection generally refers to an approach for connections between the main unit 1 and the test head 2 via common cables or wires. The wireless connection has many types, such as Bluetooth, WIFI, infrared, etc., at this time, both the interface module 14 on the main unit and the communication interface 21 on the test head 2 have a wireless transceiving circuit, and communications between the main unit 1 and the test head 2 at any time follows a processing order of "encrypting data—modulating encrypted signals—demodulating encrypted signals—decrypting data". Compared with the wired connections, the wireless connection has many advantages, for instance, the case where poor contact occurs due to oxidation of interfaces of common cables in humid environments may be avoided. In addition, the test head 2 and the main unit 1 may be separated without restricts from cables or wires, and there is no worry that the cables will be broken; the main unit 1 may be placed in a position away from the operating table, which facilitates operation.

In order to facilitate the main unit 1 to differentiate a type of a test head 2 when the test head 2 is connected to the main unit 1, the following two ways may be adopted. One way is the use of hardware difference, for instance, in communication interfaces 21 of different test heads, different partial voltage values or different operating currents may be provided, thus, the main unit may easily differentiate different types of test heads, different voltages and currents may be generated via different divider resistors and shunt resistors respectively, correspondingly, a corresponding relation between different types of test heads and communication protocols may also be stored in the storage module of the main unit. The other way is to provide a memory on a test head, the memory is pre-stored with identifier ID information, and each test head among the varieties of the test heads has unique ID information to allow the main unit to differentiate the test heads, correspondingly, in the chip processing device, the storage module of the main unit also stores a corresponding relation between the ID information and the communication protocols. When the test head 2 is connected to the main unit 1, the main unit 1 may differentiate a type of a test head by reading the ID information of the test head 2.

A connection approach between the test head 2 and the to-be-processed chip includes a wired connection approach or a wireless connection approach, which may be configured according to a type of a read-write interface of the to-be-processed chip. If the wired connection approach is used, then the test interface 22 specifically includes a plurality of probes, the read-write interface of the to-be-processed chip specifically includes a plurality of contact points, and a manner the plurality of probes of the test interface 22 is arranged corresponds to a manner the contact points of the to-be-processed chip are arranged. If the wireless connection approach is used, then the test interface 22 specifically includes an antenna capable of selecting different impedance properties, the read-write interface of the to-be-processed chip specifically includes an antenna having fixed impedance properties, and an impedance property of the antenna in the test interface 22 corresponds to an impedance property of the to-be-processed chip.

Figure 3A:
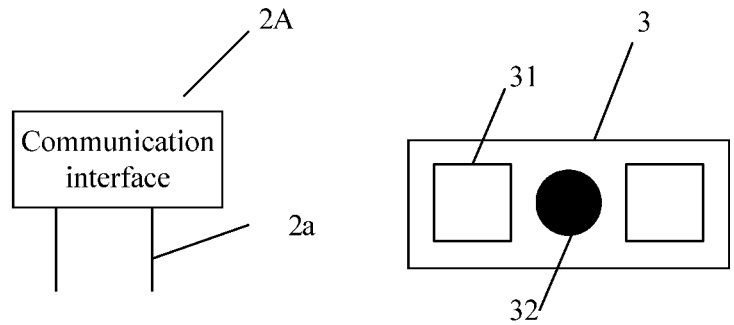
FIG. 3A is a schematic diagram of a wired connection between a test head and a to-be-processed chip according to an embodiment of the present invention.
Figure 3B:
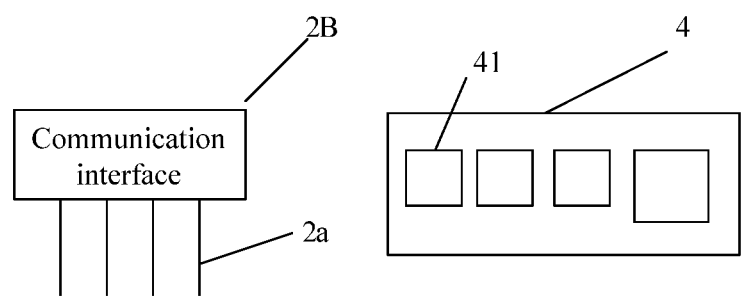
FIG. 3B is a schematic diagram of a wired connection between a test head and a to-be-processed chip according to another embodiment of the present invention.

Corresponding to different read-write interfaces of various to-be-processed chips, the chip processing device may be configured with different types of test heads, and these test heads have different probe arrangements or antennas with different impedance properties. FIG. 3A is a schematic diagram of a wired connection between a test head and a to-be-processed chip according to an embodiment of the present invention, FIG. 3B is a schematic diagram of a wired connection between a test head and a to-be-processed chip according to another embodiment of the present invention, the test head includes K test heads (N>=K>=1): test head A, test head B, . . . test head K, each test head respectively corresponds to one or more to-be-processed chips. That is to say, one test head may be configured to read and write a plurality of to-be-processed chips having same contact point arrangement or same antennas of impedance properties by using different or same communication protocols. When detecting different chips, the operator may select corresponding test heads according to types of read-write interfaces of the to-be-processed chips.

As shown in FIG. 3A and FIG. 3B, which are schematic structural diagrams of a test head in a wired connection approach. The test interface 22 of the test head specifically includes probes 2a in the figure, and arrangement of the probes 2a is set according to arrangement of contact points of a to-be-processed chip, thus, when detecting chips with different contact point arrangements, it is needed to replace corresponding test heads. FIG. 3A and FIG. 3B show two chips with different contact point arrangements and corresponding test heads. The chip 3 has a memory 32 and two contact points 31 which are configured to establish electric connections with a printer, then the probes 2a of the test head 2A are arranged in manner capable of contacting the two contact points 31 on the chip 3 well, that is, two corresponding probes are provided. The chip 4 has a memory (not shown in the figure) at a side of the circuit board, and has four contact points 41 at the other side which establish electric connections with the printer, then probes 2a of the test head 2B are designed in a manner capable of contacting the four contact points in the chip 4 well, that is, four corresponding probes are provided. During actual use, a corresponding test head may be provided according to the arrangement of contact points of a to-be-processed chip, thus, there is no limitation to the number of test heads and arrangement of probes thereof.

Figure 4:
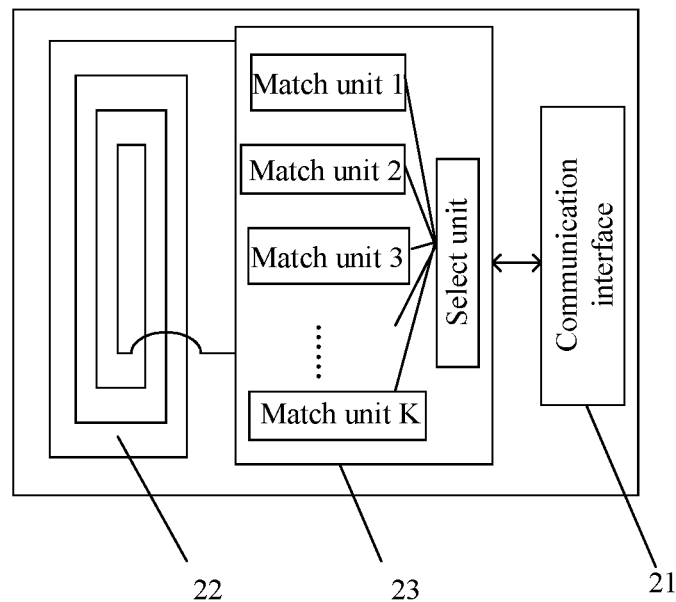
FIG. 4 is a schematic diagram of a wireless connection between a test head and a to-be-processed chip according to an embodiment of the present invention.

FIG. 4 is a schematic diagram of a wireless connection between a test head and a to-be-processed chip according to an embodiment of the present invention, as show in FIG. 4, besides the communication interface 21 and the test interface 22, the test head also includes a match system 23 therebetween which is configured to adjust the impedance property of the antenna. An object connected by means of the wireless connection approach is a wireless chip, where a read-write interface of the wireless chip is an antenna, and the wireless chip also includes a rectifying circuit usually. The match system 23 includes a select unit and a plurality of match units, where each match unit is connected to the test interface 22, and the match units have impedance properties different from each other; the select unit is connected to the plurality of match units respectively, and further connected to the communication interface 21.

The test head and the to-be-processed chip are connected via a radio frequency identification technique (Radio Frequency Identification, RFID). A radio frequency identification system generally consists of two parts, that is, an electronic tag (Electronic Tag, also referred to as a transponder) and a reader (Reader). There are two types of coupling of the radio frequency signal between the reader and the electronic tag:

A first type: Inductive Coupling. The coupling is accomplished via a spatial high frequency alternating magnetic field utilizing a transformer model, which is according to law of electromagnetic induction.

A second type: Electromagnetic Backscatter Coupling. Electromagnetic waves transmitted out by utilizing a model of radar principles are reflected when coming into touch with a target, and meanwhile carry back information about the target, which is according to law of space propagation of electromagnetic waves.

The inductive coupling method is generally applicable to a close-range radio frequency identification system operating at an intermediate or low frequency. A typical operating frequency includes: 125 kHz, 225 kHz and 13.56 MHz. The identification operating distance is generally less than 1 m, and a typical operating distance is 0-20 cm.

In embodiments of the present invention, a test head and a to-be-processed chip may transmit signals by means of the inductive coupling, generally, the to-be-processed chip which serves as a transponder does not have a power supply thereon, and a working power supply of the to-be-processed chip is provided by the test head, which then relates to a problem that how can the power output by the test head via the inductive coupling be transmitted to the to-be-processed chip maximally. In a condition where a signal source is given, the output power depends on a ratio Q of the load resistance to the internal resistance of signal source, when they are equal, that is, Q=1, the output power is largest, and the load and the signal source are impedance matching at this time. A transceiving circuit of the RFID belongs to a alternating current circuit, when the load resistance and the signal source are impedance conjugate, maximum transmission of the power can be accomplished, if the load resistance does not satisfy conjugate matching conditions, then a resistance transforming network needs to be added between the load and the signal source to transform the load resistance into conjugate of the signal source resistance, thereby achieving the impedance matching, at this time the energy obtained by the transponder is maximized.

From the perspective of energy, the transponder may be equivalent to reflected impedance on antennas of the reader, and the energy obtained by the transponder is proportional to power of the reflected impedance. In a case where carrier frequencies are the same (such as 13.56 MHz), for different wireless chips, due to the difference of antennas and peripheral circuits, their impedance is different, and reflected impedance is also different, because wireless test heads according to the present invention need to communicate with various types of to-be-processed chips having different resistance impedance, the test heads needs to have a impedance-adjustable impedance matching network.

Figure 5:
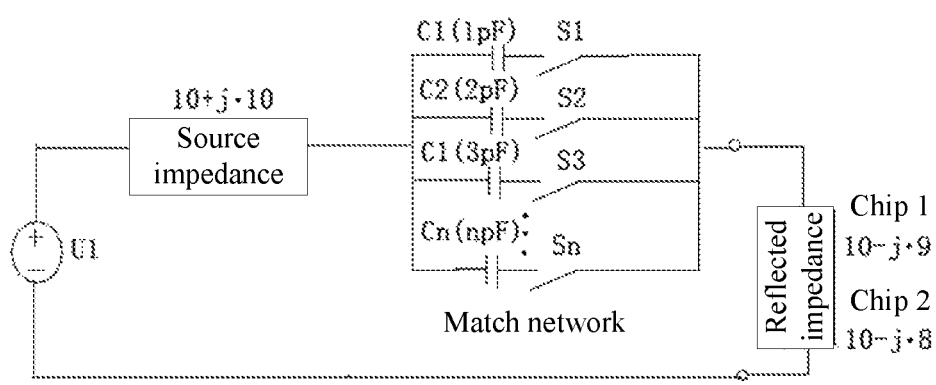
FIG. 5 is a schematic diagram of equivalent impedance between a test head and a to-be-processed chip in a wireless mode according to an embodiment of the present invention.

The impedance matching network may have a plurality of implementations, such as an inductor array network, a capacitor and inductor hybrid network or a capacitor array network. The capacitor array network is described hereunder as an example to show how the test heads can read and write wireless chips with different impedance at maximum output power. FIG. 5 is a schematic diagram of equivalent impedance between a test head and a to-be-processed chip in a wireless mode according to an embodiment of the present invention, the test head is equivalent to signal source internal impedance, the to-be-processed chip is equivalent to reflected impedance, and an impedance matching network is also provided on the test head.

The impedance matching network in FIG. 5 includes a capacitor array (C1, C2, . . . , Cn) and a controllable switch (S1, S2, . . . , Sn), the controllable switch may be implemented by adopting a semiconductor switch or a physical switch (such as a relay switch), and these switches may be controlled to be on and off via the processing module on the main unit or a controller on the test head which will be described hereunder. When the chip processing device is about to process a wireless chip, the switches S1, S2, Sn are controlled to be on or off for selecting a proper matching capacitor to enable impedance matching to reach a good level, thus, the wireless chip can obtain sufficient energy via electromagnetic induction to perform normal communications with the main unit.

Hereafter, computing of impedance-matching and working principles of the matching system will be described by taking FIG. 5 as an example:

Given conditions: signal source internal impedance of the test head is 10+j10, a carrier frequency of the test head is 13.56 MHz, reflected impedance of a to-be-processed chip 1 is 10−j9, and reflected impedance of a to-be-processed chip 2 is 10−j8, assuming that impedance of a matching network is Z.

Matching conditions: load impedance (sum of impedance of the matching network and the reflected impedance) is equal to a conjugate value of the signal source internal impedance, since the signal source impedance is 10+j10, a conjugate complex thereof is 10−j10, that is, if the load impedance reaches 10−j10, then the impedance matches.

(a) as for the chip 1, it is obtained from the above matching conditions that: 10−j9+Z=10−j10, then Z=0−j1.

A capacitor matching network is used in FIG. 5, it may be calculated that:

$$Z=-j(1/(\omega C))=-j(1/(2\pi f C))=-j1.$$

Result in, C=1/(2πf)=1/(2*3.14*13.56*1000000)=0.012 μF.

That is, matching capacitor is 12 μF, then the controllable switches are controlled via a controller, and capacitance of 12 μF is selected via combinations.

(b) as for the chip 2, it is obtained from the above matching conditions that: 10−j8+Z=10−j10, then Z=0−j2.

A capacitor matching network is used in FIG. 5, it may be calculated that:

$$Z=-j(1/(\omega C))=-j(1/(2\pi f C))=-j2.$$

Result in, C=1/(2πf)/2=1/(2*3.14*13.56*1000000)/2=0.006 μF.

That is, matching capacitor is 6 μF, then the controllable switches are controlled via a controller, and capacitance of 6 μF is selected via combinations.

It can be seen from the above examples that, since the matching system in FIG. 4 includes a select unit and a plurality of matching units, one or more proper matching units are selected according to a type of a wireless chip to enable the test head and this type of chip to be impedance matched, and thus the test head can provide sufficient operating voltages to the chip via an antenna serving as the test interface, so that the chip operates to communication with the chip processing device normally, thereby accomplishing various processing operations.

The test head generally does not has a module and a display for selecting a matching unit, thus, a look up table recording a corresponding relation between wireless chips of various models and matching units is generally stored in a storage module of the main unit, thus, if a to-be-processed chip is a wireless chip, then besides obtaining a communication protocol of the to-be-processed chip from the storage module according to an input chip model, the processing module also needs to acquire one or more matching units corresponding to chip of this model, and then control the test head to select the matching unit according to a current processing mode of the main unit, and reads data of the to-be-processed chip or writes data into the to-be-processed chip according to the communication protocol, and then determine whether the data of the to-be-processed chip is correct or whether the data is written successfully.

Moreover, since a carrier having a frequency of 125 kHz or 225 kHz differs from a carrier having a frequency of 13.56 MHz by three orders of magnitude, impedance matching networks of both of them cannot be mixed together easily, therefore, preferably, read-write antennas at different operating frequencies may be provided on both the front surface and the back surface of the test head respectively, and independent impedance matching networks may be configured respectively, then the test head has boarder universality than that provided with a read-write antenna on a single surface.

A matching system according to embodiments of the present invention can select impedance matching units matching different chips according to the chips, thereby guaranteeing normal communications with a wireless chip. Thus, it can be seen that, the present invention can solve technical problems such as poor universality and low detection efficiency of an existing wireless chip processing device by providing a test head having a matching system, thereby capable of reducing production costs.

Figure 6:
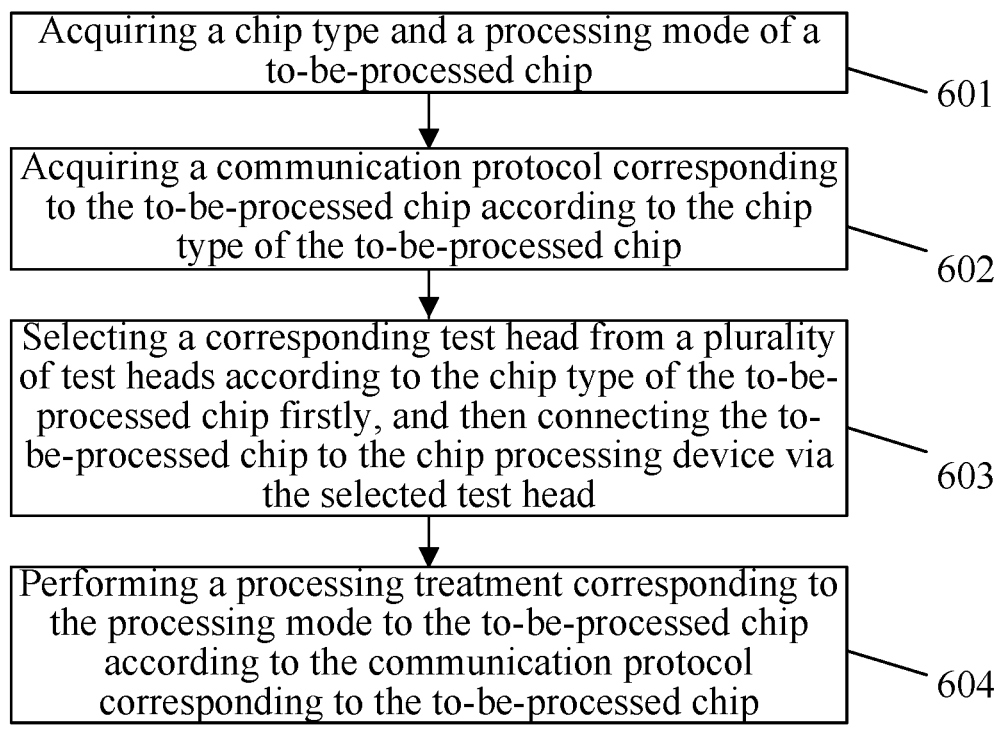
FIG. 6 is a flow chart of a chip processing method using a chip processing device according to an embodiment of the present invention.

FIG. 6 is a flow chart of a chip processing method using a chip processing device according to an embodiment of the present invention, as shown in FIG. 6, the method includes:

Step 601, acquiring a chip model and a processing mode of a to-be-processed chip.

Step 602, acquiring a communication protocol corresponding to the to-be-processed chip according to the chip model of the to-be-processed chip.

Step 603, when the chip processing device includes a plurality of test heads, then selecting a corresponding test head from the plurality of test heads according to characteristic information of the to-be-processed chip firstly, and then connecting the to-be-processed chip to the chip processing device via the selected test head.

It should be noted that, the characteristic information in this embodiment indicates characteristics such as whether the type of the read-write interface of the to-be-processed chip is wired or wireless. Selection of the test head is performed according to the above characteristic information of the to-be-processed chip, for instance, if the to-be-processed chip is the wired connection chip as shown in FIG. 3A, then it is processed according to the characteristic information of the to-be-processed chip by selecting the test head corresponding to FIG. 3A.

Obviously, if the chip processing device only includes one test head, then in step 603, it only needs to connect the to-be-processed chip to the chip processing device via the test head instead of selecting a corresponding test head from a plurality of test heads. The chip processing device including a plurality of test heads has broader universality than that only including one test head.

Step 604, performing a processing treatment corresponding to the processing mode to the to-be-processed chip according to the communication protocol corresponding to the to-be-processed chip; and a step of outputting a result of the processing treatment (not shown in FIG. 6).

Specifically, firstly, acquire model information and a processing mode of a to-be-processed chip, then, acquire a communication protocol of the model and corresponding chip data according to a corresponding relation among the model information, the communication protocol and the chip data; and then, read data of the to-be-processed chip or write data into the to-be-processed chip utilizing the communication protocol according to the acquired processing mode; secondly, determine whether the data read is correct, or determine whether the writing operation is successful; finally, output a determined result.

The step of determining whether the read data is correct is specifically: determining whether the data of the to-be-processed chip is in compliance with the data of the chip of the model as stored in the chip processing device, if so, then the data of the to-be-processed chip is correct, if not, then the data of the to-be-processed chip is not correct. Whether the writing operation is successful is determined generally by a write check response (Acknowledge) received during the writing process, if all check responses can be received and all belong to normal responses, then it can be deemed that the writing operation is successful; moreover, for insurance purpose, an approach of back reading all or a part of data just written may be used to compare whether the back-read data is consistent with the data of the model as stored in the chip processing device so as to determine whether the writing operation is successful.

The following descriptions will discuss about how to process the to-be-processed chip in various manners using the chip processing device according to the present invention.

1. Chip Identification:

Generally, model information about the to-be-processed chip is undetermined, for instance, when the to-be-processed chip is a blank chip, the model of the to-be-processed chip is determined according to data programmed (written) by an operator (a user) using the chip processing device; which may also be known, for instance, the to-be-processed chip is just removed from an imaging cartridge with a known model. However, there is usually a case that, the model of the imaging cartridge is also unknown; or a plurality of chips are mixed together, and the operator cannot determine a model of a chip due to similar appearances and various models of the chips. Thus, the chip processing device according to the present invention provides a chip identification function firstly. The chip identification function refers to that a chip processing device can read data of a to-be-processed chip in a scanning manner without inputting a model of the to-be-processed chip to identify the model of the to-be-processed chip, which thus may be referred to as "scanning" the chip.

Figure 7:
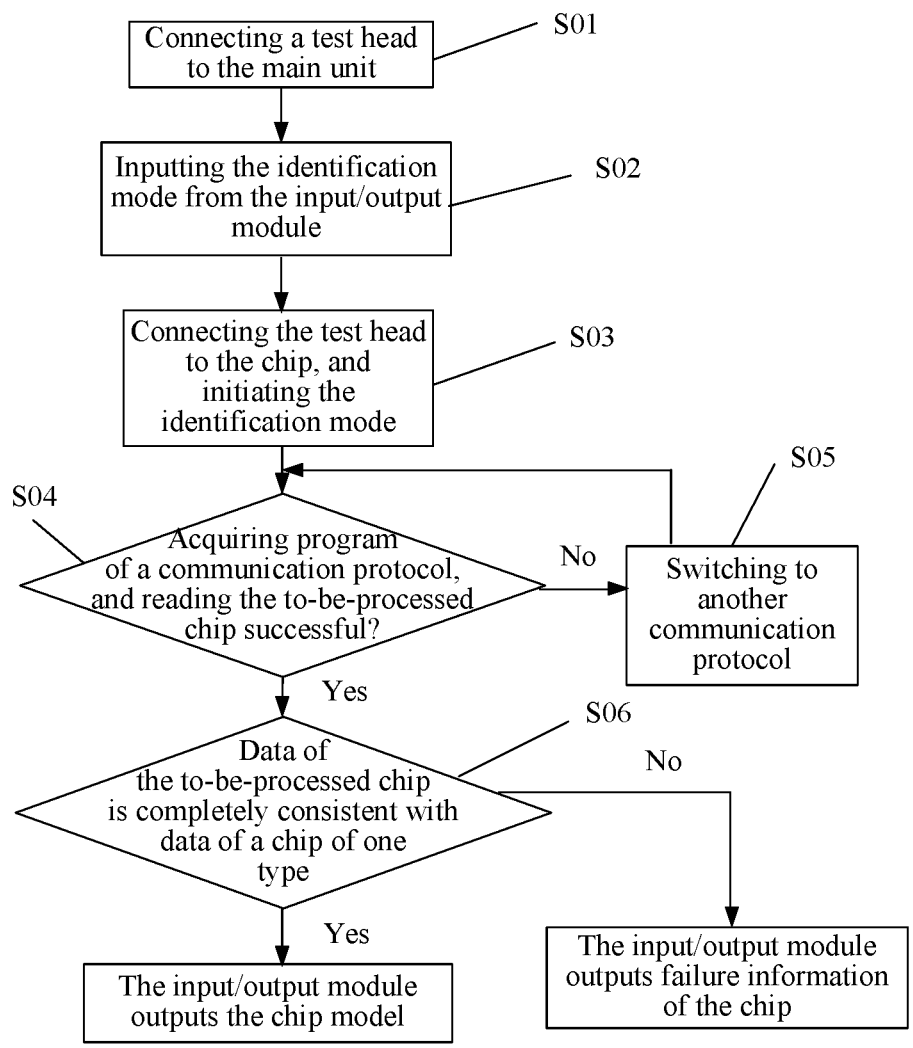
FIG. 7 is a flow chart of scanning a chip according to an embodiment of the present invention.

FIG. 7 is a flow chart of scanning a chip according to an embodiment of the present invention, as shown in FIG. 7, the scanning of the chip includes the following steps:

Step S01, selecting a proper test head and connect to the main unit, as described above, a corresponding test head may be selected according to the arrangement of contact points of the chip; if there is only one test head, then the selection is not needed.

Step S02, selecting a processing mode as the identification mode by utilizing the input/output module.

Step S03, connecting the test head to the to-be-processed chip, and initiating the identification mode via the input/output module or a key on the test head.

Step S04, the processing module reads the to-be-processed chip using a communication protocol among all communication protocols stored by the storage module, and determines whether there is normal returned data.

Step S05, if failing to read data from the to-be-processed chip or the returned data is not correct, then the processing module switches to another communication protocol, return back to step S04 to continue to read the to-be-processed chip till the last communication protocol in the storage module; if capable of reading data of the to-be-processed chip normally, then proceed with a next step S06.

Step S06, the processing module calls data of chips of all models corresponding to the communication protocol from the storage module, and compares the same with the read data of the to-be-processed chip respectively, if in consistency with data of a chip of one model, then the model of the to-be-processed chip is the compared model, and outputs the model of the to-be-processed chip through the input/output module; if none of them is found to be consistent, then the to-be-processed chip may be subject to a failure or there is no data of the to-be-processed chip in the storage module, outputs information indicating failure or unidentification of the to-be-processed chip through the input/output module.

Obviously, for a to-be-processed chip which has been switched to all communication protocols but still fails to read data, there may be a case that the to-be-processed chip is subject to a failure, or there may be a case that the storage module does not have data of the to-be-processed chip, and the information indicating failure or unidentification of the to-be-processed chip is output by the input/output module.

As mentioned above, different types of test heads may be differentiated by the main unit by means of hardware or software, considering this, a corresponding relation between different types of test heads and respective communication protocols may also be stored in the storage module. Then, the above described step S04 and step S05 may be performed as follows:

S14, the processing module firstly identifies the type of a test head, then reads the to-be-processed chip using a communication protocol in a plurality of communication protocols corresponding to the type of the test head, and determines whether there is normal returned data.

S15, if failing to read data from the to-be-processed chip or the returned data is not correct, then the processing module switches to another communication protocol in the plurality of communication protocols corresponding to the type of the test head, return back to step S14 to continue to read the to-be-processed chip till the last communication protocol in the plurality of communication protocols corresponding to the type of the test head; if capable of reading data of the to-be-processed chip normally, then proceed with a next step S06.

It should be noted that, since one test head may be applied for a plurality of chips of different models, thus, there isn't a one-to-one correspondence between types of test heads and communication protocols of the chips, as described above, when a test head has stored ID information, a test head ID may represent more than one different communication protocols.

Thus, it can be seen that, in the identification mode, the processing module may communicate with the to-be-processed chip in a polling manner by utilizing various communication protocols respectively till data of the to-be-processed chip can be read successfully. When the above steps S14 and S15 are used, that is, firstly identifying a test head and then switching to a communication protocol within a smaller range, the speed for identifying the to-be-processed chip may be improved evidently.

The above described chip identification process is to read all readable data of the chip, and then compare the same with the data stored by the storage module in the main unit, if the to-be-processed chip is subject to a failure resulting in incorrectness of a part of data, which then will not be completely consistent with data of a chip of any model in the storage module, and the processing module cannot determine the model of the chip. Thus, a process that the processing module identifies the model of the to-be-processed chip may be meanwhile interpreted as a process that whether the data of the to-be-processed chip is detected correctly.

Obviously, such a chip identification method can only identify a chip whose chip data has not been changed, if the chip has been installed into an imaging device and has been read and written by the imaging device, then the chip processing device cannot identify the chip. Moreover, when using the above method to identify the chip, all data of the to-be-processed chip needs to be read and compared, then identification efficiency is relatively low. In the data stored by the chip, only a part of data is used to indicate intrinsic properties of the chip, such as type or color of a recording material accommodated in an imaging cartridge corresponding to the chip, these identity data indicating intrinsic properties of the chip will not be changed in a process of being read and written by the imaging device, thus, during chip identification, these identity data can be read merely to improve the identification efficiency.

Thus, it is taken into consideration that data characteristics of identity data of chips of different models may be added in the storage module of the main unit, at least including data characteristics such as data of product models or data of recording material colors/types. The data characteristics indicate a parameter name and a stored address of identity data of the chip. Therefore, at the time of reading data of the to-be-processed chip, the processing module may only read identity data in the to-be-processed chip according to these data characteristics, and then compare the same with the identity data stored in the storage module of the main unit, if in consistency with identity data of a chip of one model, then the model of the to-be-processed chip is the compared model, the model of the to-be-processed chip is output by the input/output module, thus capable of improving reading efficiency.

Moreover, identity data of chips of a part of models indicates their chip models by themselves, then after reading the identity data, there is no need to compare the same with identity data in the storage module of the main unit, and the chip model may be obtained only through some conventional transforms directly. For instance, a model of some chips is "711", when identity data of the chips themselves is "711" stored in a form of an ASCII code, it can be determined that the model of the chips is "711" without a comparison.

2. Chip Detection:

Chip detection refers to that, after a model of a to-be-processed chip is input or the model of the to-be-processed chip is determined via the identification mode, the chip processing device determines whether data stored by the to-be-processed chip is correct by reading data of the to-be-processed chip and comparing the same with the data stored by the chip processing device. Thus, an operator may use the device to detect a plurality of chips with different models.

Figure 8:
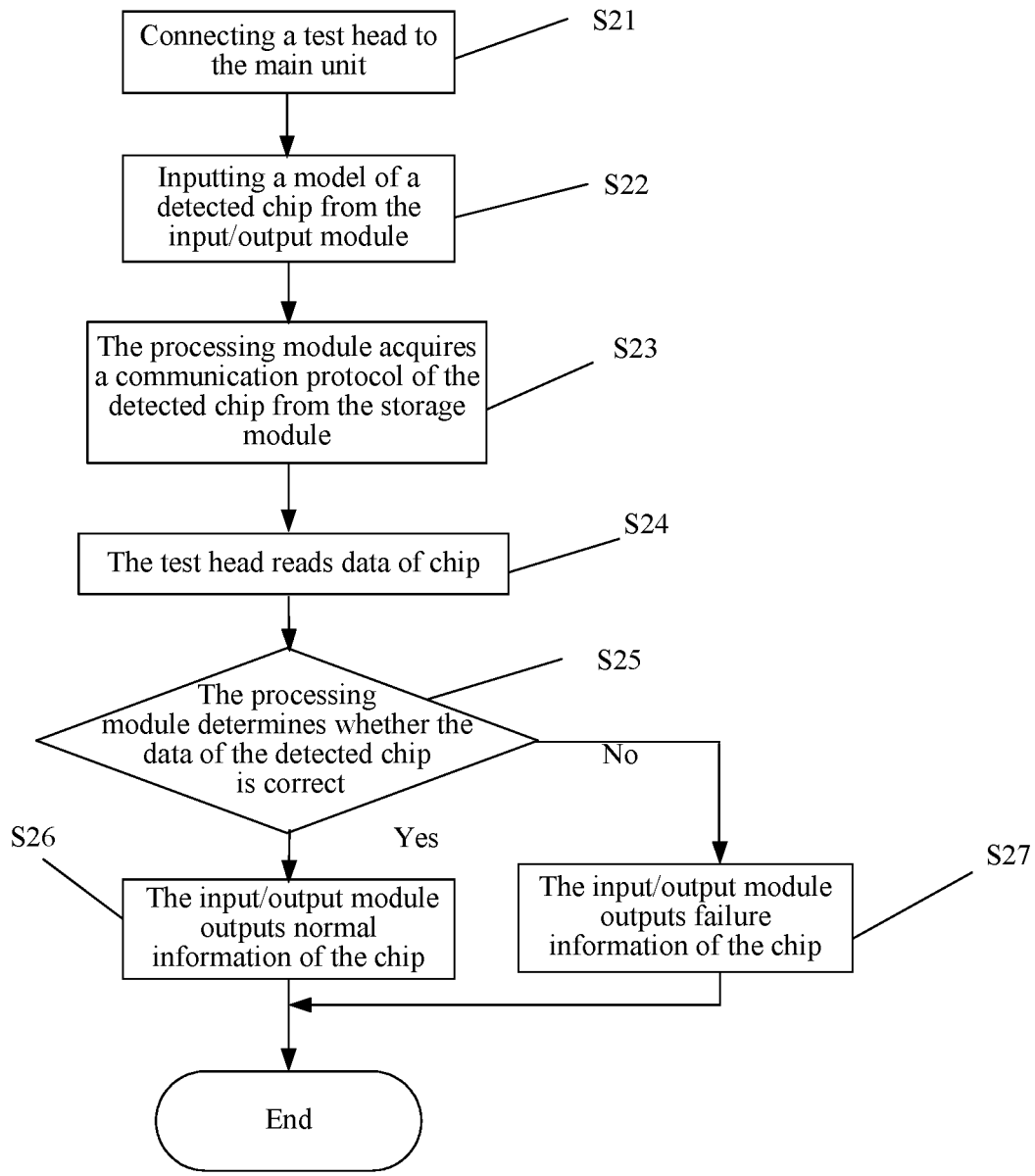
FIG. 8 is a flow chart of a method for detecting a to-be-processed chip according to an embodiment of the present invention.

FIG. 8 is a flow chart of a method for detecting a to-be-processed chip according to an embodiment of the present invention, as shown in FIG. 8, the workflow of the method includes:

Step S21, selecting a proper test head and connecting the same to the main unit; if there is only one test head, then the selection is not needed.

Step S22, acquiring a model of a to-be-processed chip from the input/output module or determining the model of the to-be-processed chip via the identification mode, and acquiring a detection mode from the input/output module.

Step S23, the processing module acquires a communication protocol of the detected chip from the storage module. Specifically, the processing module determines a communication protocol and chip data used by the to-be-processed chip from a corresponding relation in the second storage unit according to the acquired model of the to-be-processed chip, and then acquires a program of the communication protocol from the first storage unit.

Step S24, initiating the detection mode via the input/output module or a key on the test head, and reading data of the to-be-processed chip via the test head according to the acquired communication protocol.

Step S25, the processing module determines whether the data of the to-be-processed chip is correct.

Specifically, in step S25, the processing module compares the read data of the to-be-processed chip with the data of the chip of the model as stored in the third storage unit, and determines whether they are consistent with each other, if so, then it is deemed that the data of the to-be-processed chip is correct, proceed with step S26; if not, then it is deemed that the data of the to-be-processed chip is not correct, proceed with step S27.

Step S26, the input/output module outputs information indicating the to-be-processed chip is normal.

Step S27, the input/output module outputs information indicating the to-be-processed chip failure.

During a process where a chip is installed into an imaging device to exchange data with the imaging device, not all data stored in the chip will be read and/or rewritten by the imaging device, in other words, not all data stored in the chip is useful for imaging operations. If all data of the to-be-processed chip needs to be read and compared when the chip is detected, then detection efficiency is relatively low. Thus, in order to improve the detection efficiency, it may only need to ensure that the useful data stored by the chip which is useful for imaging operations is correct, and even though an error occurs in the remaining data, it will not impose influence on a fact that the chip can be read and written by the imaging device normally. The useful data refers to data used when the imaging device communicates with an imaging cartridge chip during an imaging process, for instance, data about ink usage (hereafter referred to as ink quantity data) or data about toner usage (hereafter referred to as toner quantity data). Thus, only useful data may be compared after data of the to-be-processed chip is read during chip detection.

Furthermore, only useful data in the to-be-processed chip may be read. It is taken into consideration that data characteristics of useful data of chips of different models may be added in the storage module of the main unit, at least including data characteristics such as ink quantity data or toner quantity data. The data characteristics indicate a parameter name and a stored address of the useful data of the chip. Correspondingly, the processing module controls a test head to read data corresponding to the data characteristics as stored in a to-be-processed chip according to a communication protocol corresponding to the to-be-processed chip.

Figure 9:
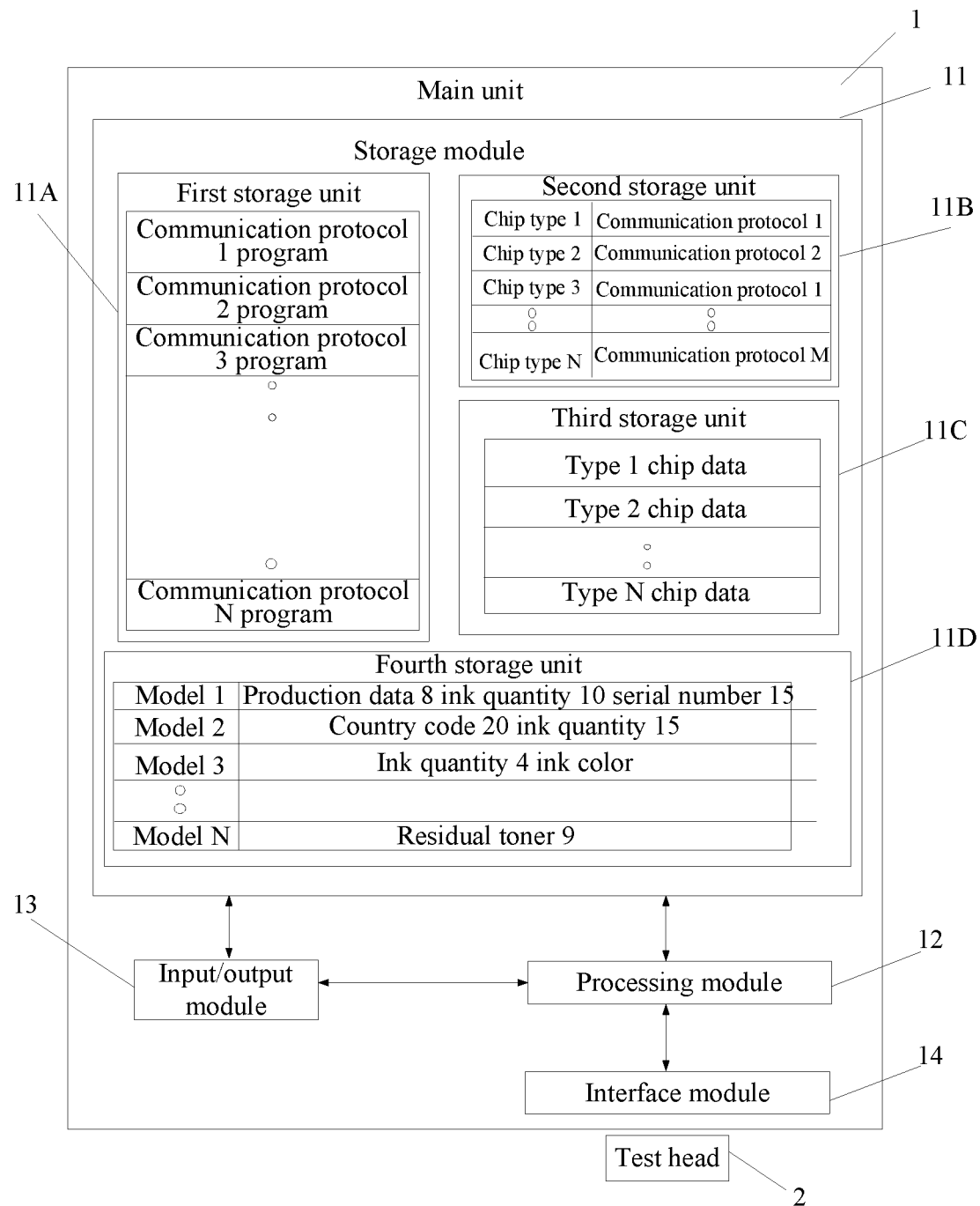
FIG. 9 is a schematic diagram of storage of data characteristics in an embodiment of the present invention.

FIG. 9 is a schematic diagram of storage of data characteristics in an embodiment of the present invention, as shown in FIG. 9, in the fourth storage unit 11D, data characteristics of the chip of model 1 is specifically that data about ink quantity is stored in the tenth byte of the chip, data about production date is stored in the eighth byte of the chip, and data about serial number is stored in the fifteenth byte of the chip. Thus, when reading data of the to-be-processed chip, the processing module may merely read useful data in the to-be-processed chip according to these data characteristics, and then compare the same with the useful data stored in the storage module of the main unit, thus capable of improving reading efficiency.

Moreover, taking into a further consideration of saving space of the storage module, only useful data of chips of different models and characteristic data thereof may be stored in the storage module. In the drawing, data of the chip of model 1 as stored in the fourth storage unit is data of the eighth byte, the tenth byte and the fifteenth byte of the chip. In the foregoing step S27, the processing module may also temporarily store in the storage module an inconsistent data type obtained after the read data of the to-be-processed chip is compared with chip data in the storage module, such as serial number, recording material color, used range, etc, after the data comparison ends, the processing module outputs these information to the input/output module to clearly notify the user which data in the to-be-processed chip is subject to a failure.

3. Chip Programming:

A chip programming function refers to that, after acquiring a chip model requiring to be programmed to a to-be-processed chip via the input/output module or the identification mode, the chip processing device writes all data of the chip of this model into the to-be-processed chip. It can be seen that, the to-be-processed chip may be a blank chip, and may also be a chip which has been stored with data of a chip of certain model, some chips having a hardware structure may be written with data of chips of different models as required.

Figure 10:
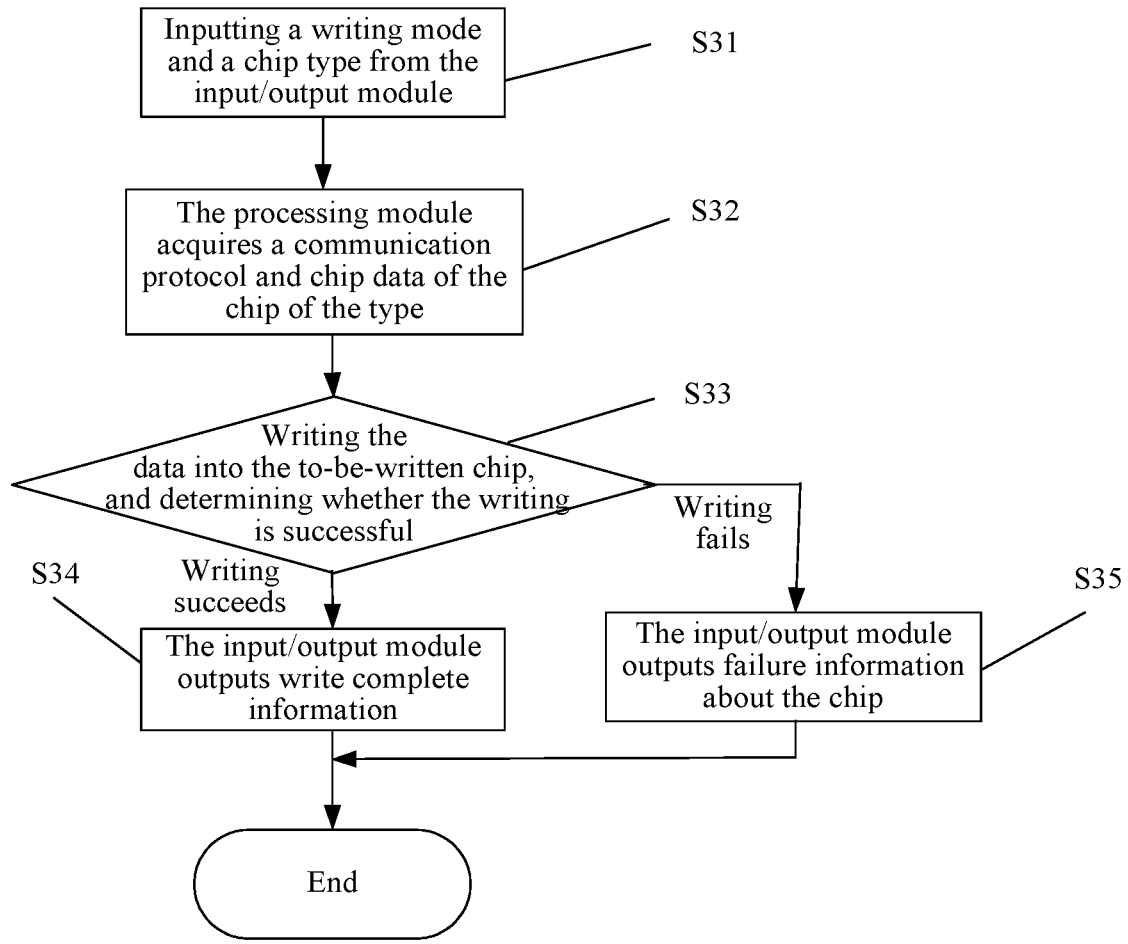
FIG. 10 is a flow chart of a chip programming method according to an embodiment of the present invention.

FIG. 10 is an action flow chart of the chip processing device according to this embodiment under a programming mode, and the method flow includes:

Step S31, acquiring a chip model of a to-be-processed chip that needs to be programmed via the input/output module or the identification mode, and acquiring a programming mode from the input/output module.

Step S32, the processing module acquires a communication protocol of the chip of corresponding model from the second storage unit, and acquires chip data of the chip of corresponding model from the third storage unit.

Step S33, initiating the programming mode via the input/output module or a key on a test head, and writing the acquired chip data into the to-be-processed chip via the test head according to the acquired communication protocol. If succeeding in writing the data, then proceed with step S34, if failing to write the data, then proceed with step S35.

Step S34, the input/output module outputs information indicating completely write in.

Step S35, the input/output module outputs information indicating chip failure.

After succeeding in writing data into a to-be-written chip, the operator may select a detection mode from the input/output module to perform data detection to the to-be-written chip so as to guarantee correctness of the chip data.

As described above, whether the writing operation is successful is determined generally by means of determining a write check response received during the writing process, or back reading all or a part of data just written, if the latter back reading approach is used, then it may be understood that, the programming mode substantially includes steps of performing the detection mode subsequent to the writing mode.

4. Chip Resetting

After the chip together with the imaging cartridge is installed into a printing and imaging device, as the number of printed pages increases, recording materials (such as ink, toner) are consumed constantly, data about the usage of the recording materials included in the chip is also rewritten constantly, when the recording materials are used up, the printer will remind the user of replacing the imaging cartridge and the imaging cartridge chip. After the imaging cartridge is replaced, if the data about the usage of the recording materials of the imaging cartridge chip is still data indicating that the recording materials are not enough, the imaging cartridge chip must be replaced at the same time, and then the printing can be performed, in this case, the imaging cartridge chip cannot be recycled for use, thereby resulting in waste of resources.

The chip processing device according to the present invention also provides a chip resetting function. The chip resetting mode is, at least, to rewrite data indicating usage of recording materials inside the chip into data indicating that there is sufficient recording materials, generally, to rewrite useful data in the to-be-processed chip into a value in the storage module of the main unit.

The method flow of the chip processing device under the resetting mode is as follow:

Step S41, selecting a proper test head and connecting the same to the main unit; if there is only one test head, then the selection is not needed.

Step S42, acquiring a chip model of a to-be-processed chip that needs to be reset via the input/output module or the identification mode, and acquiring the resetting mode from the input/output module.

Step S43, the processing module acquires a communication protocol used by the chip of this model from the second storage unit, and acquires at least data about usage of recording materials of the chip of this model and a stored address from the fourth storage unit.

Step S44, initiating the resetting mode via the input/output module or a key on the test head, rewriting data of the address in the to-be-processed chip into the acquired data via the test head according to the acquired communication protocol and the acquired address. If succeeding in rewriting, then proceed with step S45; if failing to rewrite, then proceed with step S46.

The method for determining whether the rewriting is successful is similar to the method for determining whether the programming is successful as described above.

Step S45, the input/output module outputs information indicating successful reset.

Step S46, the input/output module outputs information indicating chip failure.

5. Chip Inspection:

After the chip is read and written by the imaging device for a period of time, the user wants to get knowledge of conditions of the chip; when the chip is abnormal, the user wants to know which parts of data of the chip is abnormal. Apparently, the above described chip detecting mode cannot provide a solution. In this embodiment, the chip processing device is also provided with a processing mode for inspecting the chip. Chip inspection refers to a processing method for reading data corresponding to data characteristics in the to-be-processed chip by using the data characteristics of the parts of data stored in the storage module of the main unit, and then revealing the data via the input/output module in real time.

Thus, it is taken into consideration that data characteristics of to-be-inspected data of chips of different models may be added in the storage module of the main unit, the to-be-inspected data is set by the designer according to a requirement of the user, which may be all data of the chip, but generally refers to the useful data described above. The data characteristics indicate a parameter name and a stored address of the to-be-inspected data of the chip.

The processing method for chip inspection is similar to the processing method for chip detection, including:

Step S51, selecting a proper test head and connecting the same to the main unit; if there is only one test head, then the selection is not needed.

Step S52, acquiring a model of a to-be-processed chip via the input/output module or the identification mode, and acquiring a inspection mode from the input/output module.

Step S53, the processing module acquires a communication protocol used by the chip of the model from the second storage unit, and acquires at least a parameter name and a stored address of useful data of the chip of the model from the second storage unit.

Step S54, initiating the inspection mode via the input/output module or a key on the test head, and reading data of the address in the to-be-processed chip via the test head according to the acquired communication protocol and the acquired address. If the data of the address can be read, then proceed with step S55; if the data of the address cannot be read from the to-be-processed chip, then proceed with step S56.

Step S55, after the data of the address is read, if the read data is known as plaintext data, the processing module then converts the read data into a conventional value according to parameter names corresponding to respective data, and then outputs the respective parameter names and the value via the input/output module. For instance, the test head reads data of a fifth address of the to-be-processed chip, a parameter name of the address is remaining ink quantity, if the read data is "00001000", indicating a decimal number "16", then after "16" is converted into percentage data "16%", output "remaining ink quantity 16%". Likewise, related information such as production date, manufacturer, chip model and used range of the chip may be inspected according to other data characteristics.

If the processing mode input by the input/output module is the inspection mode, the processing module then controls, according to the inspection mode, the test head to read data stored in the to-be-processed chip according to the communication protocol corresponding to the to-be-processed chip, and performs format conversion processing to the data, in the step S55, the converting of the read plaintext data into the conventional value is one of format conversion processing treatments to the data. Correspondingly, the input/output module is further configured to output the data processed by the processing module via the format conversion processing.

Step S56, the input/output module outputs information indicating chip failure.

Moreover, generally, chips are stored with encrypted data (also known as cipher text), and a part of chips is also stored with unencrypted data (also known as plaintext), therefore, when the chip processing device is used to inspect a to-be-processed chip, if the to-be-processed chip is stored with the plaintext, to-be-inspected data may be output via the input/output module directly after the data is read; on the contrary, if the to-be-processed chip is stored with the cipher text, then the main unit, after reading the cipher text via a test head, also needs to call a decryption algorithm related to the to-be-processed chip so as to read the cipher text to obtain the plaintext, and then read to-be-inspected data according to data characteristics of the to-be-inspected data, and finally output a inspection result. Thus, "perform format conversion processing to the data" as mentioned in the step S55 may also be: interpret the read data by using the decryption algorithm related to the to-be-processed chip. Obviously, the related decryption algorithm may also be stored in the storage module of the main unit according to the fact whether data stored by chips of different models is cipher data.

Likewise, during the chip detection, plaintext data of a to-be-processed chip may also be stored in the main unit, if data obtained by reading the to-be-processed chip is cipher data, then call a decryption algorithm related to the to-be-processed chip, firstly, the cipher data is read to obtain plaintext data, then compare the decrypted plaintext data with the plaintext data stored in the main unit, and then output a detection result.

The processing module is further configured to determine legitimacy of the data processed via format conversion according to a preset rule, that is, a case may be that correctness of the data may also be determined during inspection of the to-be-processed chip to determine whether the data satisfies some rule conditions. For instance, a rule indicating a serial number of a chip can only be an ASCII code, if the rule according to which data is actually stored by the chip is arbitrary number, then it is inspected that a current serial number rule is abnormal; the determining of the legitimacy of the data processed via the format conversion according to the preset rule may also be: determining whether the data processed via the format conversion has been changed according to the fact whether the data is changeable data, if the data is unchangeable data but has been changed, then it may be determined that the data is illegitimate.

Upgrade maintenance of the chip processing device will be described hereunder.

After a chip processing device is sold to a recycling manufacturer or a distributor (hereafter referred to as a user), since a printing and imaging device newly released on the market is usually accompanied with a newly released imaging cartridge chip, at this time, the chip processing device which has been circulated in the market cannot support processing of the new chip, in order to support the newly released chip, an existing practice is usually that the manufacturer retrieves the chip processing device from the user, and returns it back to the user after upgrading the chip processing device. As time goes by, upgrade maintenances for the chip processing device may increase, frequent round-trip transportation of the chip processing device not only consumes a lot of time and manpower, but also may easily damage the chip processing device. The present invention also provides a convenient method for upgrade maintenance of the chip processing device.

(1) Composition of an Upgrade Package:

The method for upgrade maintenance of the chip processing device according to the present invention transmits an upgrade package to the user over internet, after using the upgrade package to upgrade the chip processing device, the user may update a chip model supported in the chip processing device, and may also fix a bug (Bug) in a program of the chip processing device. Moreover, as one of business models, expenses needed are different when the chip is identified, detected, programmed, reset or inspected by using the chip processing device, one way is to set different consumption credits (Credit) for each processing method, or different chips corresponds to different consumption credits, for instance, credits consumed for the chip detection are 0, credits consumed for simple chip programming are 10, and credits consumed for complex chip programming are 18, thus, the chip processing device also stores available credits generally.

The upgrade package of the chip processing device according to the present invention includes data such as the above described credits, data of chips of different models, communication protocols, random number, a header file and a program of the main unit, where the header file includes time for generating the upgrade package, a device ID of the main unit, a package number of the upgrade package, validation data of the upgrade package, etc.

The validation data of the upgrade package is provided to the chip processing device to identify whether the upgrade package is legitimate. A value may be calculated according to a certain algorithm in the light of data such as a core security code, the device ID of the main unit, the random number, etc., the foregoing validation data is obtained by intercepting a part of the value.

(2) Programming of the Upgrade Package

In order to facilitate the upgrade maintenance of the chip processing device, the manufacturer establishes an upgrade maintenance server for the chip processing device to configure storage and packing of the upgrade package, and transportation of the upgrade package on the server, the user is connected to the server via internet, and is connected to a computer via an upgrade interface of the main unit of the chip processing device after the upgrade package is downloaded locally, the computer is installed with an upgrade management client, and the upgrade package may be programmed (Program, which means to write in essence) into the chip processing device via the client.

When the main unit receives a header file of the upgrade package, step S61, the processing module uses the same method as described above to calculate and intercept validation data, and then compares the validation data calculated by the main unit with validation data in the header file, if they are consistent, then it is determined that the upgrade package is legitimate, otherwise the upgrade package is illegitimate. Step S62, after determining that the upgrade package is legitimate, compare the device ID stored in the storage module of the main unit with a device ID in the header file, if the device IDs are consistent, then it is determined that the upgrade package is an upgrade package of the chip processing device. Step S63, read an upgrade package number which has been stored in the storage module of the main unit, compare the same with an upgrade package number in the header file, if the storage module has been stored with the upgrade package number, then it is determined that the upgrade package is an invalid upgrade package which has been used, and this upgrade package is forbidden to be used for upgrading; if the storage module has not been stored with the package number of the upgrade package, then the upgrade package is allowed to be used for upgrading. After the three determining steps described above, the chip processing device is conducted with writing upgrade. During the upgrade process, determine whether credits in the upgrade package are 0, if so, then the package number of the upgrade package will not be stored in the storage module; otherwise, if credits in the upgrade package are not 0, then the package number of the upgrade package will be stored in the storage module.

Thus, it can be seen that, the upgrade process of the chip processing device described above has the following advantages:

(1) The chip processing device does not accept an illegitimate upgrade package, and thus interference from the illegitimate upgrade package is avoided.

(2) A legitimate upgrade package can only upgrade a chip processing device having a certain device ID, and thus mixture of upgrade packages will be prevented.

(3) An upgrade package with credits can only upgrade a chip processing device having a certain device ID once. Thus, reuse of the upgrade package with credits may be avoided, and credit loss suffered by the manufacturer of the chip processing device will be reduced.

(4) An upgrade package without credit may upgrade a chip processing device having a certain ID number many times, which allows the user to use the same upgrade package for repeated fixing when the chip processing device is subject to abnormalities.

As the number of models of to-be-processed chips increases, the storage module of the main unit needs to pre-store communication protocol programs of more chips and chip data, thus, a storage module of large capacity needs to be provided at the time of manufacturing the main unit of the chip processing device, which will result in increase of initial manufacturing costs; if main units of different storage capacities are manufactured as required by the user, then troubles are incurred in the manufacturing process and sorted storage. Since a newly added chip model usually uses a new communication protocol, for a chip with contact points in a manner of a wired connection, arrangement of the contact points is usually in a new form, the newly added chip model needs to be equipped with a new test head generally. Therefore, it is taken into consideration that communication protocol programs and/or chip data may be stored in the test head.

Figure 11:
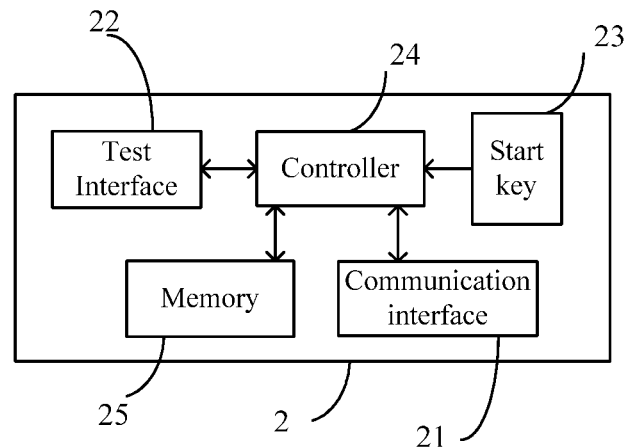
FIG. 11 is a schematic structural diagram of another test head according to an embodiment of the present invention.

FIG. 11 is a schematic structural diagram of another test head according to an embodiment of the present invention, as shown in FIG. 11, besides the test interface 22, the communication interface 21 and the start key 23, the test head also includes a controller 24 and a memory 25. Functions of the test interface 22, the communication interface 21 and the start key 23 are similar to the functions thereof in the foregoing embodiments, which will not be repeated herein. The memory 25 is stored with a communication protocol program corresponding to the type of the test head and/or corresponding chip data, then in the foregoing processing modes, the processing module does not acquire the communication protocol program and/or the corresponding chip data from the storage module, instead it acquires the same from the memory 25 of the test head; or in the processing modes, the controller 24 of the test head performs respective processing treatments to the to-be-processed chip according to the communication protocol program and/or the chip data stored in the memory 25, and the processing module only needs to transmit various operating instructions to the controller 24 of the test head, that is, transmit a signal input by the input/output module to the controller or transmit data read by the test head to the input/output module. The controller 24 reads data of the to-be-processed chip or writes data into the to-be-processed chip according to the communication protocol acquired by the processing module.

Therefore, since capacity of the storage module of the main unit may decrease, costs of the main unit are reduced, users may select a corresponding test head as required, then for chips that need to be processed having fewer models, the users only need to purchase a main unit and several test heads of lower costs, thus their costs are reduced. Manufacturers may manufacture main units of a unified standard to reduce troubles incurred from manufacturing and sorted storage. In addition, in order to prevent a third party from cracking data and the method according to which the chip processing device processes a chip, under the circumstance that capacity of a storage module of the main unit is reduced, some key data is also stored in the storage module generally, such as a signal code.

In the chip processing device according to embodiments of the present invention, the input/output module of the chip processing device may be an interface reserved for a computer or a single chip microcomputer, at this time, when inputting various operating instructions into the main unit or the main unit feedbacks determined results, it is a necessity that a third party device (e.g. a computer) interacts with the main unit via this reserved interface. In this case, the chip processing device does not need to have a display and an input system, which enables the chip processing device to be miniaturized, and thus production costs are reduced.

The input/output module may also be a module including a key/virtual key input device and an output interface, at this time the main unit may output the determined results to an external display or computer via the output interface.

The input/output module may also be a touch screen with an input function or a module including the screen and the key/virtual key input device. Such chip processing device may be independent of large scale equipments such as a computer, and may be used conveniently.

As the number of models of chips that need to be added in the chip processing device grows, when the user needs to select a chip of a certain model from the chip processing device via the input/output module for processing, the selection is made from many chip models. Generally, chips of different models are classified by the following method: firstly, a first stage classification is performed according to brands of printers applicable for the chips, and then a second stage classification is performed according to shapes or types of chip PCBs (Printed Circuit Board) under each brand. When the main unit is connected to different test heads, the user needs to select, from a displayed three-level menu, a band of a chip that needs to be programmed from brands of all printers on the main unit firstly, and then select a PCB type (a type corresponding to the test head) of the chip from all PCB board types belonging to this brand, and finally select a specific model of the chip. Apparently, the user takes a lot of time in selecting a proper model from all models on the main unit.

Figure 12:
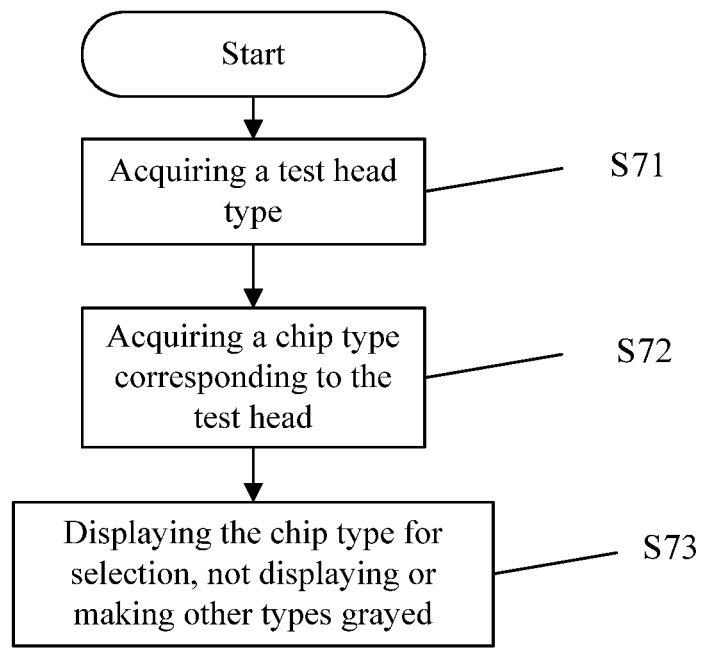
FIG. 12 is a flow chart of a control method of display according to an embodiment of the present invention.

The processing module of the main unit may determine a type of a test head via a divider resistor or ID information on the test head. Making full use of this, a display mode for optimizing a user interface (User Interface, UI) of the main unit is taken into consideration. FIG. 12 is a flow chart of a display and control method according to an embodiment of the present invention, as shown in FIG. 12, the process includes:

Step S71, the processing module of the main unit acquires a test head type;

Step S72, the processing module acquires a PCB board type corresponding to the test head type and corresponding chip models from the storage module of the main unit;

Step S73, display chip models corresponding to the test head on a displayer for selection, not display chip models which are not corresponding to the test head or display it in a non-selective display mode (such as grayed). The displayer may be the input/output module in itself, or a displayer connected to the input/output module.

Since fewer number of chip models corresponds to one test head, after the type of the test head is determined, a selection range displayed to the user decreases significantly, the user does not need to make the selection step by step in the three-level menu, thus, it can be seen that, the user may select a chip model conveniently according to such solution, thereby improving the speed for processing the chip, and reducing workload for processing the chip.

The chip processing device according to the present invention can program, detect, reset or inspect a plurality of chips, and meanwhile has one or more functions of programming (Program, which may also be interpreted as writing), detecting, identifying, resetting or inspecting. The plurality of chips has different communication interfaces, and/or uses different communication protocols. The chip processing device can be configured to program, detect, identify, reset or inspect a chip after obtaining a model of the chip to be processed, thus having higher universality.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A chip processing device, comprising:
 a main unit and a test head;
 wherein the main unit comprises a storage module, a processing module, an input/output module and an interface module;
 the storage module is stored with a plurality of chip models, communication protocols corresponding to the plurality of chip models, and information about a plurality of processing modes of the chip processing device, the plurality of processing modes at least comprises a inspection mode;
 the input/output module is configured to input a processing mode of a to-be-processed chip, input a chip model of the to-be-processed chip, or output a processing result;
 the processing module is configured to acquire a communication protocol corresponding to the to-be-processed chip in the storage module according to the chip model of the to-be-processed chip as input by the input/output module or a chip model acquired by identifying the to-be-processed chip; and control the test head to perform a processing treatment corresponding to the processing mode input by the input/output module to the to-be-processed chip according to the communication protocol corresponding to the to-be-processed chip;
 the interface module is configured to perform communication connections with the test head;
 the test head comprises a communication interface and a test interface, wherein:
 the communication interface is configured to perform communication connections with the interface module of the main unit;
 the test interface is configured to perform communication connections with the to-be-processed chip,
 wherein if the processing mode input by the input/output module is the inspection mode, then the controlling the test head to perform the processing treatment corresponding to the processing mode input by the input/output module to the to-be-processed chip according to the communication protocol corresponding to the to-be-processed chip specifically includes:
 the processing module controls, according to the inspection mode, the test head to read data stored in the to-be-processed chip according to the communication protocol corresponding to the to-be-processed chip, and performs format conversion processing to the data;
 accordingly, the input/output module is further configured to output the data processed by the processing module via the format conversion processing.

2. The device according to claim 1, wherein, the storage module is further stored with data characteristics corresponding to chips of each model, wherein the data characteristics indicate a parameter name and a storage address of data to be inspected; accordingly, the controlling the test head to read the data stored in the to-be-processed chip according to the communication protocol corresponding to the to-be-processed chip and the performing the format conversion processing to the data comprises:

the processing module controls the test head to read data corresponding to the data characteristics as stored in the to-be-processed chip according to the communication protocol corresponding to the to-be-processed chip, and performs format conversion processing to the data.

3. The device according to claim 2, wherein:

the processing module is further configured to determine legitimacy of the data processed via format conversion according to a preset rule.

4. The device according to claim 1, wherein, the chip processing device comprises a variety of test heads, and test interfaces in the test heads are different.

5. The device according to claim 4, wherein, different partial voltage values or different operating currents are provided in communication interfaces of the test heads to enable the main unit to differentiate the test heads; accordingly, a corresponding relation between different types of test heads and communication protocols is stored in the storage module of the main unit.

6. The device according to claim 4, wherein, each test head further comprises a memory, the memory is stored with an identifier ID uniquely corresponding to the test head to enable the main unit to differentiate the test head; accordingly, the storage module of the main unit is further stored with a corresponding relation between the identifier ID and the communication protocol.

7. The device according to claim 1, wherein, a wired connection approach or a wireless connection approach is used between the test head and the to-be-processed chip;

if the wired connection approach is used, then the test interface specifically includes a plurality of probes, and a manner in which the plurality of probes is arranged corresponds to a manner in which contact points of the to-be-processed chip are arranged;

if the wireless connection approach is used, then the test interface specifically includes an antenna capable of selecting different impedance properties, and an impedance property of the antenna corresponds to an impedance property of the to-be-processed chip.

8. The device according to claim 7, wherein, if the test interface specifically includes an antenna, then the antenna further comprises a match system connected between the communication interface and the test interface, which is configured to adjust the impedance property of the antenna, wherein the match system comprises:

a plurality of match units connected to the test interface, wherein the match units have impedance properties different from each other;

a select unit, connected to the plurality of match units respectively, and further connected to the communication interface.

9. The device according to claim 8, wherein, the storage module is further stored with the corresponding relation between the chip models and the match units.

10. The device according to claim 1, wherein, the input/output module is specifically any one of:

an interface preserved for a computer or a single chip microcomputer;

a module comprising a key/virtual key input device and an output interface; and a touch screen with an input function or a module comprising a screen and a key/virtual key input device.

11. A chip processing method using a chip processing device, comprising:

acquiring a chip model and a processing mode of a to-be-processed chip;

acquiring a communication protocol corresponding to the to-be-processed chip according to the chip model of the to-be-processed chip;

connecting the to-be-processed chip to the chip processing device via a test head;

performing a processing treatment corresponding to the processing mode to the to-be-processed chip according to the communication protocol corresponding to the to-be-processed chip; and outputting a result of the processing treatment, wherein if the processing mode is an inspection mode, then the performing the processing treatment corresponding to the processing mode to the to-be-processed chip according to the communication protocol corresponding to the to-be-processed chip specifically includes:

reading data stored in the to-be-processed chip according to the communication protocol corresponding to the to-be-processed chip, and performing format conversion processing to the data.

12. The method according to claim 11, wherein, the chip processing device comprises a plurality of test heads, then selecting a corresponding test head from the plurality of test heads according to characteristic information of the to-be-processed chip firstly, and then connecting the to-be-processed chip to the chip processing device via the selected test head.

\* \* \* \* \*